United States Patent
Yasue et al.

(10) Patent No.: US 7,350,006 B2
(45) Date of Patent: Mar. 25, 2008

(54) SYSTEM AND METHOD OF INTERRUPT HANDLING

(75) Inventors: Masahiro Yasue, Kanagawa (JP); Keisuke Inoue, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 70 days.

(21) Appl. No.: 11/346,947

(22) Filed: Feb. 3, 2006

(65) Prior Publication Data

US 2006/0200610 A1   Sep. 7, 2006

Related U.S. Application Data

(60) Provisional application No. 60/649,984, filed on Feb. 4, 2005.

(51) Int. Cl.
*G06F 13/26* (2006.01)

(52) U.S. Cl. .................. 710/264; 710/267; 710/261

(58) Field of Classification Search ........ 710/260–269, 710/58–60, 48–51
See application file for complete search history.

(56) References Cited

U.S. PATENT DOCUMENTS

| | | | |
|---|---|---|---|
| 4,247,894 A | 1/1981 | Beismann et al. |
| 4,574,350 A | 3/1986 | Starr |
| 4,636,944 A | 1/1987 | Hodge |
| 4,716,523 A | 12/1987 | Burrus, Jr. et al. |
| 4,736,319 A | 4/1988 | DasGupta et al. |
| 4,751,634 A | 6/1988 | Burrus, Jr. et al. |
| 4,794,526 A | 12/1988 | May et al. |
| 4,901,234 A | 2/1990 | Heath et al. |
| 4,908,750 A | 3/1990 | Jablow |
| 4,954,948 A | 9/1990 | Hira et al. |
| 4,980,820 A | 12/1990 | Youngblood |
| 4,987,529 A | 1/1991 | Craft et al. |
| 5,003,466 A | 3/1991 | Schan, Jr. et al. |
| 5,083,258 A | 1/1992 | Yamasaki |
| 5,088,022 A | 2/1992 | Iwata |
| 5,099,414 A | 3/1992 | Cole et al. |
| 5,109,329 A | 4/1992 | Strelioff |
| 5,111,425 A | 5/1992 | Takeuchi et al. |
| 5,146,597 A | 9/1992 | Williams |
| 5,212,795 A | 5/1993 | Hendry |

(Continued)

FOREIGN PATENT DOCUMENTS

EP   0602858 A   6/1994

(Continued)

OTHER PUBLICATIONS

Furman, Roy, "Interrupt handling with VxDs optimizes multitasking OS" Personal Engineering, Jan. 1996.

*Primary Examiner*—Raymond N Phan
(74) *Attorney, Agent, or Firm*—Lerner, David, Littenberg, Krumholz & Mentlik, LLP

(57) ABSTRACT

A multiprocessor system and method wherein one of the processors is assigned the responsibility of handling interrupts and identifying the next processor to handle an interrupt. When that processor switches tasks and determines that it is no longer the least important processor as far as task priority is concerned, it will then select and transfer its interrupt-related responsibilities (i.e., handling the interrupt and determining the next interrupt-handing processor) to the processor which is executing the least important task. The selected processor will then be designated for handling interrupts unless and until it undergoes a task switch and selects a different processor.

12 Claims, 7 Drawing Sheets

U.S. PATENT DOCUMENTS

| | | |
|---|---|---|
| 5,247,671 A | 9/1993 | Adkins et al. |
| 5,257,375 A | 10/1993 | Clark et al. |
| 5,283,904 A | 2/1994 | Carson et al. |
| 5,291,609 A | 3/1994 | Herz |
| 5,379,381 A | 1/1995 | Lamb |
| 5,379,434 A | 1/1995 | DiBrino |
| 5,390,300 A | 2/1995 | Pribnow et al. |
| 5,452,452 A * | 9/1995 | Gaetner et al. ............. 718/103 |
| 5,469,571 A | 11/1995 | Bunnell |
| 5,515,538 A | 5/1996 | Kleiman |
| 5,553,293 A | 9/1996 | Andrews et al. |
| 5,555,383 A | 9/1996 | Elazar et al. |
| 5,560,019 A * | 9/1996 | Narad ........................ 710/260 |
| 5,590,380 A | 12/1996 | Yamada et al. |
| 5,606,703 A | 2/1997 | Brady et al. |
| 5,613,128 A * | 3/1997 | Nizar et al. ................. 710/266 |
| 5,652,848 A | 7/1997 | Bui et al. |
| 5,696,976 A | 12/1997 | Nizar et al. |
| 5,701,495 A | 12/1997 | Arndt et al. |
| 5,768,599 A | 6/1998 | Yokomizo |
| 5,777,629 A | 7/1998 | Baldwin |
| 5,794,072 A | 8/1998 | Nomura et al. |
| 5,822,595 A | 10/1998 | Hu |
| 5,875,343 A | 2/1999 | Binford et al. |
| 5,892,956 A * | 4/1999 | Qureshi et al. ............. 710/260 |
| 5,907,712 A | 5/1999 | Slane |
| 5,944,800 A | 8/1999 | Mattheis et al. |
| 5,966,543 A | 10/1999 | Hartner et al. |
| 5,974,522 A | 10/1999 | Torng et al. |
| 5,995,745 A | 11/1999 | Yodaiken |
| 6,115,778 A | 9/2000 | Miyake et al. |
| 6,148,361 A | 11/2000 | Carpenter et al. |
| 6,199,124 B1 | 3/2001 | Ramakrishnan et al. |
| 6,219,741 B1 | 4/2001 | Pawlowski et al. |
| 6,275,749 B1 | 8/2001 | Saville et al. |
| 6,289,369 B1 | 9/2001 | Sundaresan |
| 6,347,349 B1 | 2/2002 | Neal et al. |
| 6,385,638 B1 | 5/2002 | Baker-Harvey |
| 6,418,496 B2 * | 7/2002 | Pawlowski et al. ......... 710/264 |
| 6,430,643 B1 * | 8/2002 | Arndt ........................ 710/263 |
| 6,473,780 B1 | 10/2002 | Barcelo |
| 6,490,642 B1 | 12/2002 | Thekkath et al. |
| 6,601,120 B1 | 7/2003 | Schimmel |
| 6,606,676 B1 | 8/2003 | Deshpande |
| 6,629,252 B1 | 9/2003 | Gholami et al. |
| 6,633,942 B1 | 10/2003 | Balasubramanian |
| 6,647,431 B1 | 11/2003 | Utas |
| 6,665,760 B1 | 12/2003 | Dotson |
| 6,701,405 B1 | 3/2004 | Adusumilli et al. |
| 6,813,665 B2 * | 11/2004 | Rankin et al. .............. 710/260 |
| 6,920,516 B2 * | 7/2005 | Hartwell et al. ............ 710/263 |
| 2005/0120147 A1 | 6/2005 | Koyama |
| 2006/0179198 A1* | 8/2006 | Inoue et al. ................ 710/260 |
| 2006/0206634 A1 | 9/2006 | Torisaki et al. |

FOREIGN PATENT DOCUMENTS

| | | |
|---|---|---|
| JP | 05-204867 | 8/1993 |
| JP | 2005-004562 | 1/2005 |
| JP | 07-160656 | 6/2007 |

* cited by examiner

SYSTEM AND METHOD OF INTERRUPT HANDLING

CROSS-REFERENCE TO RELATED APPLICATIONS

This application claims the benefit of the filing date of U.S. Provisional Patent Application No. 60/649,984 filed Feb. 4, 2005, the disclosure of which is hereby incorporated herein by reference.

BACKGROUND OF THE INVENTION

Multi-processor systems, although they vary in specific architecture, typically use a sub-system to handle signals and interrupts from devices and from processor tasks. A typical multi-processor system may include a central processor, a plurality of sub-processors, a memory, a system bus, and an input/output channel for communication with devices and data networks.

Some multi-processor systems attempt to handle interrupts through a central processor. The central processor designates one or more sub-processors to handle interrupts as they occur, and upon receipt of an interrupt from a system device, an interrupt task is transmitted over the system bus to the designated sub-processor. However, centralization of interrupt handling can result in a "bottleneck" at the central processor, especially in systems of higher complexity.

In other systems, the multi-processor system uses a parallel bus to broadcast interrupts to all sub-processors. One or more of the sub-processors are designated to accept the interrupt, and thereafter execute the interrupt task. However, such systems may suffer congestion problems as the size of the multi-processor system, and hence the number of interrupts broadcast to all processors, increases.

DETAILED DESCRIPTION

Figure 1:
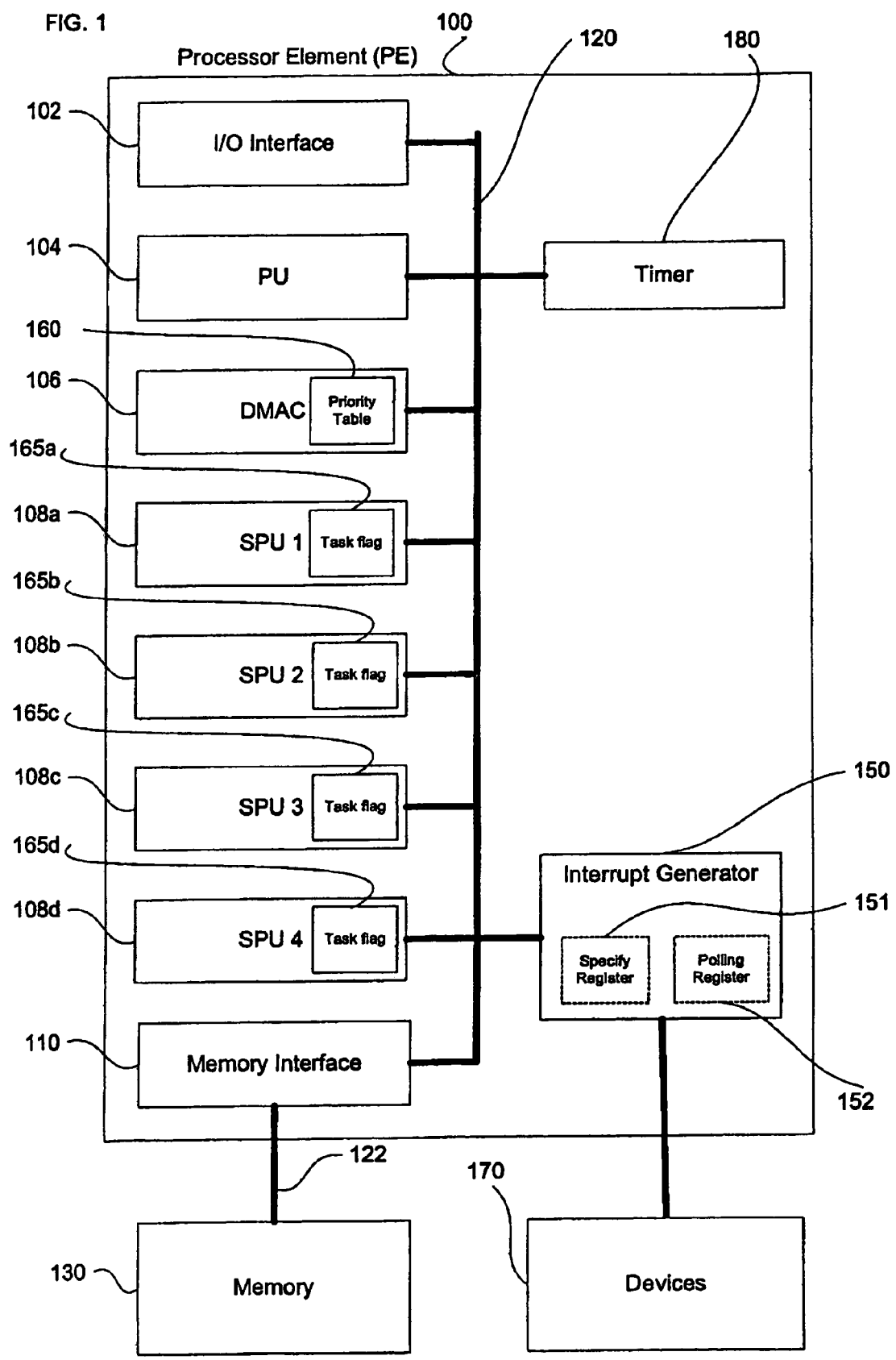
FIG. 1 is a diagram illustrating an exemplary structure of a processing element (PE) in accordance with aspects of the present invention.

Reference is now made to FIG. 1, which is a block diagram of a basic processing module or processor element (PE) 100 that can be employed in accordance with aspects of the present invention. As shown in this figure, the PE 100 preferably comprises an I/O interface 102, a processing unit (PU) 104, a direct memory access controller (DMAC) 106, and a plurality of sub-processing units (SPUs) 108, namely SPUs 108a-108d. While four SPUs 108a-d are shown, the PE 100 may include any number of such devices. A local (or internal) PE bus 120 transmits data and applications among PU 104, the SPUs 108, I/O interface 102, DMAC 106 and a memory interface 110. Local PE bus 120 can have, e.g., a conventional architecture or can be implemented as a packet switch network. Implementation as a packet switch network, while requiring more hardware, increases available bandwidth.

The PE further includes, or has access to, a timer 180 which is indicated as being internal to the PE but may also be located externally.

The PE 100 is preferably capable of determining, internally and without assistance from elements outside of the PE 100, which SPUs will execute particular tasks based on the priority level of the task. For example, PU 104 will determine, based on the priority level of a task, whether and which SPU 108 is currently available to take a task. PU 104 also determines whether an SPU should switch its current task to another processor (internal or external PE 100) in order to take a higher-priority task.

PE 100 may further include an interrupt generator (IG) 150. An interrupt generator (IG) 150 provides information indicative of whether there is a pending interrupt request.

Figure 2:
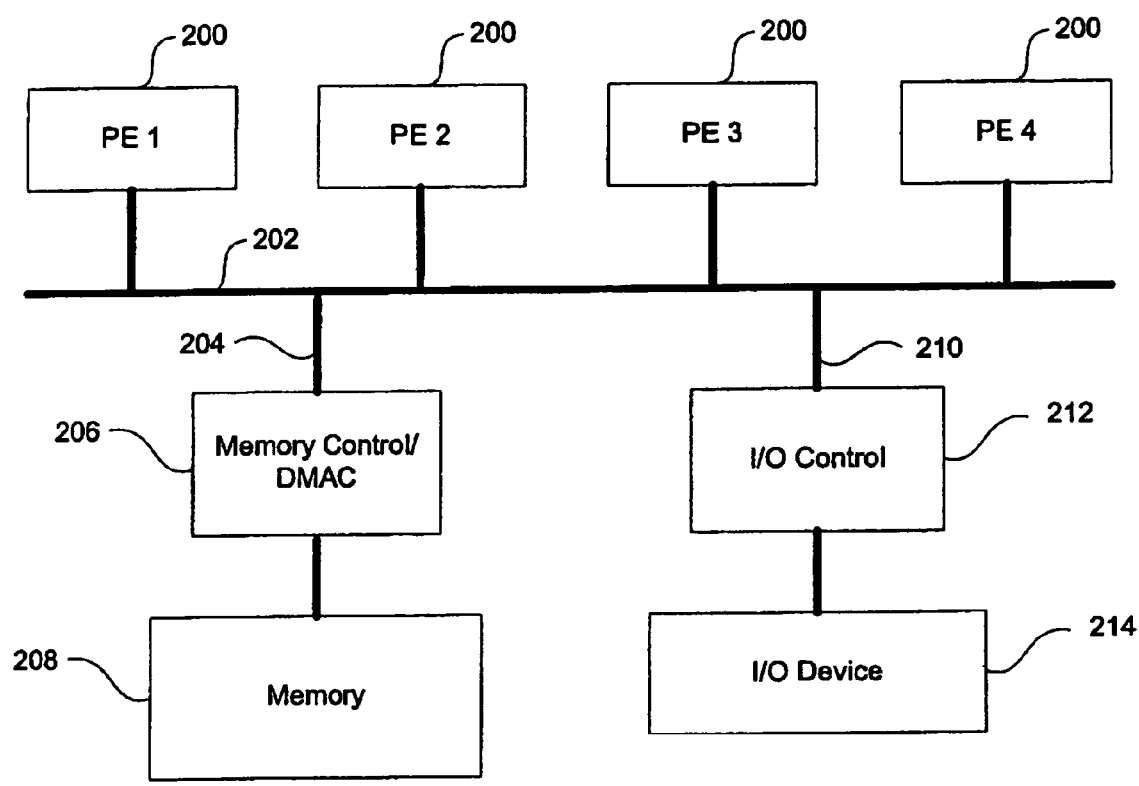
FIG. 2 is a diagram illustrating an exemplary structure of a multiprocessing system of PEs in accordance with aspects of the present invention.

The interrupt information managed by IG 150 may result from an interrupt coming from any source, including IG 150 itself, other elements within PE 100, or from devices connected to the PE such as devices 170 (which may include I/O Control 212 as shown in FIG. 2). IG 150 may receive the interrupt request directly from a device 170 on a dedicated interrupt signal line or it may receive the information via I/O Interface 102 and the Local PE Bus 120.

The IG 150 may send information to the other elements of PE 100, such as via Local PE Bus 120. IG 150 may also be polled for information by the other elements of PE 100, such as by PU 104 or any of the SPUs 108.

Preferably, IG 150 includes either a Specify Register 151, a Polling Register 152 or both. The dotted lines in FIG. 1 are intended to indicate the fact that some embodiments of the invention include one, but not the other, register. In this regard, references to the "Specify Register Embodiment" refers to a PE or other system which uses a Specify Register 151 as indicated below, but does not use the Polling Register 152. Similarly, references to the "Polling Register Embodiment" refers to a PE or other system which uses the Polling Register 152 as indicated below, but does not use the Specify Register 151.

Neither the Specify Register Embodiment nor the Polling Register Embodiment require that the IG 150 or any other element broadcast interrupt information to the various processors of the PE, such as SPUs 108 or PU 104. Moreover, these and other aspects of the system tend to obviate the need for dedicated interrupt channels, arbitration or conflict resolution, which commensurately lowers overhead and increases the likelihood of scalability to large systems without creating bottlenecks. However, while various embodiments of the invention are capable of obviating the need for such broadcasts, channels, arbitration or conflict resolutions, such methods and system are not incompatible with, and may also be used with, the present invention.

The Specify Register 151 stores a value which points to one of the SPUs 108, and is generally intended to indicate which SPU should process an interrupt request.

Moreover, in the Specify Register Embodiment, IG 150 is preferably configured to transmit an interrupt packet via bus 120 to the SPU 108 designated by the Specify Register 151. An interrupt packet includes the information that the SPU requires in order to respond to the interrupt. For example, the interrupt packet may be an interrupt handler task, or a pointer to the task. The interrupt packet may also include the address of the processor which should handle the interrupt and data, such as an identification of the source of the interrupt or user-defined information.

The Polling Register 152 stores information relating to whether an interrupt request is pending, such as a pointer to an interrupt packet or the reason the interrupt occurred.

A Priority Table is stored in memory accessible to the processors that assist in the determination of which processor should handle the next interrupt. The priority table may be located in other elements internal or external to the system as long as the table is accessible to the system elements that use the table. For example, because PE 200 contains a collection of task-executing SPUs 108, Priority Table 160 may be stored in DMAC 106, which substantially operates as the system-wide memory for the system comprising PE 100. The information contained in Priority Table 160 may be accessible to SPUs 108 via an atomic command and atomic cache. It may also be preferable to store the Priority Table in cache memory, such as in an L1 or l2 cache in PU 104, or in the atomic cache of an individual SPU.

In one aspect of the invention, the Priority Table stores only two items of information: a pointer to one of the SPUs 108 and a value that equals or points to the priority level of the task being executed by that SPU. For example, the total size of Priority Table 160 will be 8 bytes if the pointer comprises a unique ID assigned to one of the SPUs 108, the unique ID is 4 bytes long, and the priority level is 4 bytes long. The description herein may also apply in certain aspects to PU 104; for example, PU 104 may also function as the lowest processor in which case the pointer may also identify PU 104.

PE 100 can be constructed using various methods for implementing digital logic. PE 100 preferably is constructed, however, as a single integrated circuit employing CMOS on a silicon substrate. PE 100 is closely associated with a memory 130 through a high bandwidth memory connection 122. The memory 130 desirably functions as the main memory for PE 100. Although the memory 130 is preferably a dynamic random access memory (DRAM), the memory 130 could be implemented using other means, e.g., as a static random access memory (SRAM), a magnetic random access memory (MRAM), an optical memory, a holographic memory, etc. DMAC 106 and memory interface 110 facilitate the transfer of data between the memory 130 and the SPUs 108 and PU 104 of the PE 100.

PU 104 can be, e.g., a standard processor capable of stand-alone processing of data and applications. In operation, the PU 104 schedules and orchestrates the processing of data and applications by the SPUs 108. In an alternative configuration, the PE 100 may include multiple PUs 104. Each of the PUs 104 may control one, all, or some designated group of the SPUs 108. The SPUs 108 are preferably single instruction, multiple data (SIMD) processors. Under the control of PU 104, the SPUs 108 may perform the processing of the data and applications in a parallel and independent manner. DMAC 106 controls accesses by PU 104 and the SPUs 108 to the data and applications stored in the shared memory 130. Preferably, a number of PEs, such as PE 100, may be joined or packed together, or otherwise logically associated with one another, to provide enhanced processing power.

FIG. 2 illustrates a processing architecture comprised of multiple PEs 200 (PE 1, PE 2, PE 3, and PE 4) that can be operated in accordance with aspects of the present invention. Preferably, the PEs 200 are on a single chip. The PEs 200 may or may not include the subsystems such as the PU and/or SPUs discussed above with regard to the PE 100 of FIG. 1. The PEs 200 may be of the same or different types, depending upon the types of processing required. For example, one or more of the PEs 200 may be a generic microprocessor, a digital signal processor, a graphics processor, microcontroller, etc.

The PEs 200 are preferably tied to a shared bus 202. A memory controller or DMAC 206 may be connected to the shared bus 202 through a memory bus 204. The DMAC 206 connects to a memory 208, which may be of one of the types discussed above with regard to memory 130. An I/O controller 212 may also be connected to the shared bus 202 through an I/O bus 210. The I/O controller 212 may connect to one or more I/O devices 214, such as frame buffers, disk drives, etc. It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued on Feb. 25, 2003, and U.S. application Ser. No. 09/816,004, entitled "Computer Architecture and Software Cells for Broadband Networks," filed on Mar. 22, 2001, which are hereby expressly incorporated by reference herein.

Figure 3:
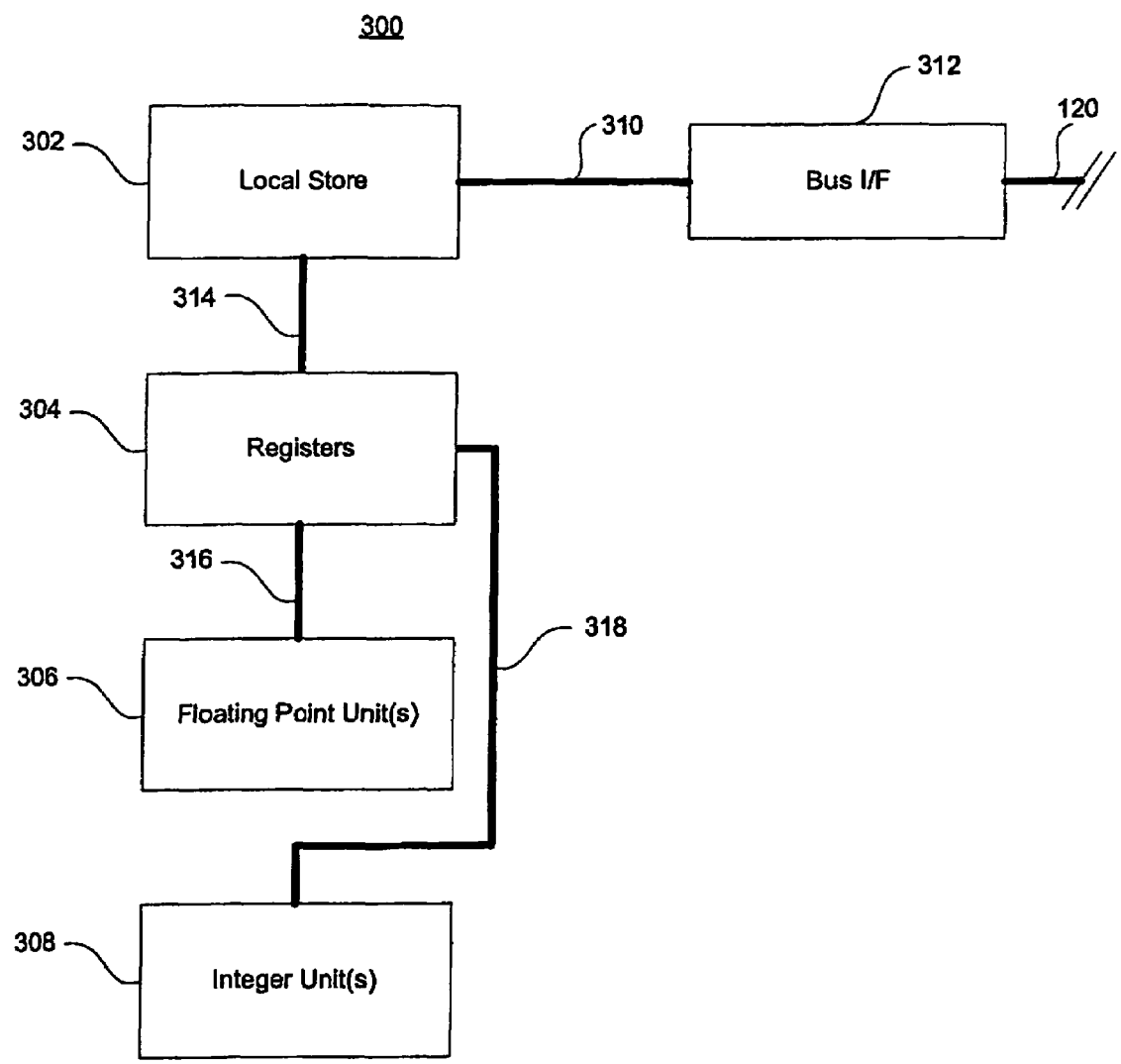
FIG. 3 is a diagram illustrating an exemplary structure of a sub-processing unit (SPU) in accordance with aspects of the present invention.

FIG. 3 illustrates the structure and function of an SPU 300 that can be employed in accordance with aspects of the present invention. One or more SPUs 300 may be integrated in the PE 100. In a case where the PE includes multiple PUs 104, each of the PUs 104 may control one, all, or some designated group of the SPUs 300.

SPU 300 preferably includes or is otherwise logically associated with local store (LS) 302, registers 304, one or more floating point units 306 and one or more integer units 308. The components of SPU 300 are, in turn, comprised of subcomponents, as will be described below. Depending upon the processing power required, a greater or lesser number of floating point units (FPUs) 306 and integer units (IUs) 308 may be employed. In a preferred embodiment, local store 302 contains at least 128 kilobytes of storage, and the capacity of registers 304 is 128×128 bits. Floating point units 306 preferably operate at a speed of at least 32 billion floating point operations per second (32 GFLOPS), and integer units 308 preferably operate at a speed of at least 32 billion operations per second (32 GOPS).

Local store 302 is preferably not a cache memory. Cache coherency support for the SPU 300 is unnecessary. Instead, the local store 302 is preferably constructed as an SRAM. A PU 104 may require cache coherency support for direct memory access initiated by the PU 104. Cache coherency support is not required, however, for direct memory access initiated by the SPU 300 or for accesses to and from external devices, e.g., I/O device 214. Local store 302 may be implemented as, e.g., a physical memory associated with a particular SPU 300, a virtual memory region associated with the SPU 300, a combination of physical memory and virtual memory, or an equivalent hardware, software and/or firmware structure. If external to the SPU 300, the local store 302 may be coupled to the SPU 300 via a SPU-specific local bus, or may be coupled via a system bus such as local PE bus 120.

SPU 300 further includes bus 310 for transmitting applications and data to and from the SPU 300 through a bus interface (Bus I/F) 312. In a preferred embodiment, bus 310 is 1,024 bits wide. SPU 300 further includes internal busses 314, 316 and 318. In a preferred embodiment, bus 314 has a width of 256 bits and provides communication between local store 302 and registers 304. Busses 316 and 318 provide communications between, respectively, registers 304 and floating point units 306, and registers 304 and integer units 308. In a preferred embodiment, the width of busses 316 and 318 from registers 304 to the floating point or integer units is 384 bits, and the width of the busses 316 and 318 from the floating point or integer units to the registers 304 is 128 bits. The larger width of the busses from the registers 304 to the floating point units 306 and the integer units 308 accommodates the larger data flow from the registers 304 during processing. In one example, a maximum of three words are needed for each calculation. The result of each calculation, however, is normally only one word.

Preferably, each SPU has an identifier by which it can be identified by the Priority Table 160. However, any data structure or the like may be used by the Priority Table to point to an SPU.

In accordance with one aspect of the invention, each SPU stores and maintains a value indicative of whether it will handle the next interrupt. Preferably, one and only one of the processors, among the collection of relevant processors, will store the value that indicates that it will handle the next interrupt-related task. For example, each SPU 108 preferably includes a 1-bit Task Flag 165a-d and only one of the Task Flags 165a-d will have the value of 1 whereas all of the other flags will have the value of 0. Each SPU can check its own Task Flag to determine—without accessing any other elements of PE 100—whether it is the designated "one" among the collection of SPUs 108. For ease of reference, the SPU with its Task Flag set to 1 shall be referred to herein as the "Lowest Processor." Despite the nomenclature, there may be moments in time where the Lowest Processor is not the SPU having the task with the lowest priority.

Preferably, each SPU and PU executes tasks in accordance with its own kernel, which may be identical for each of the processors.

In addition to the operations illustrated in FIGS. 4-7, various operations in accordance with a variety of aspects of the invention will now be described. It should be understood that the following operations do not have to be performed in the precise order described below. Rather, various steps can be handled in reverse order or simultaneously.

Figure 4:
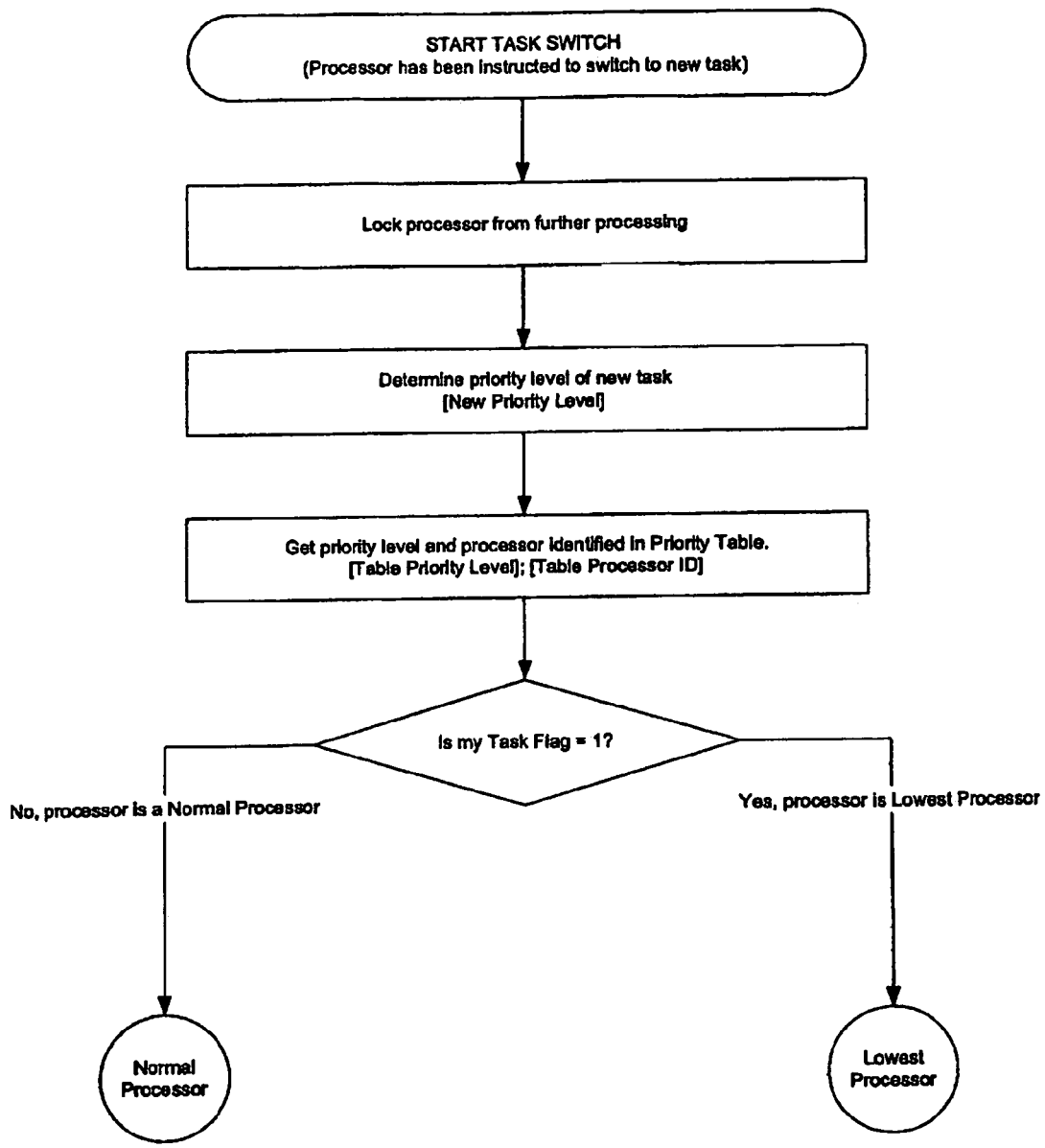
FIG. 4 is a flowchart of some of the steps performed by a processor when switching tasks in accordance with aspects of the present invention.
Figure 5:
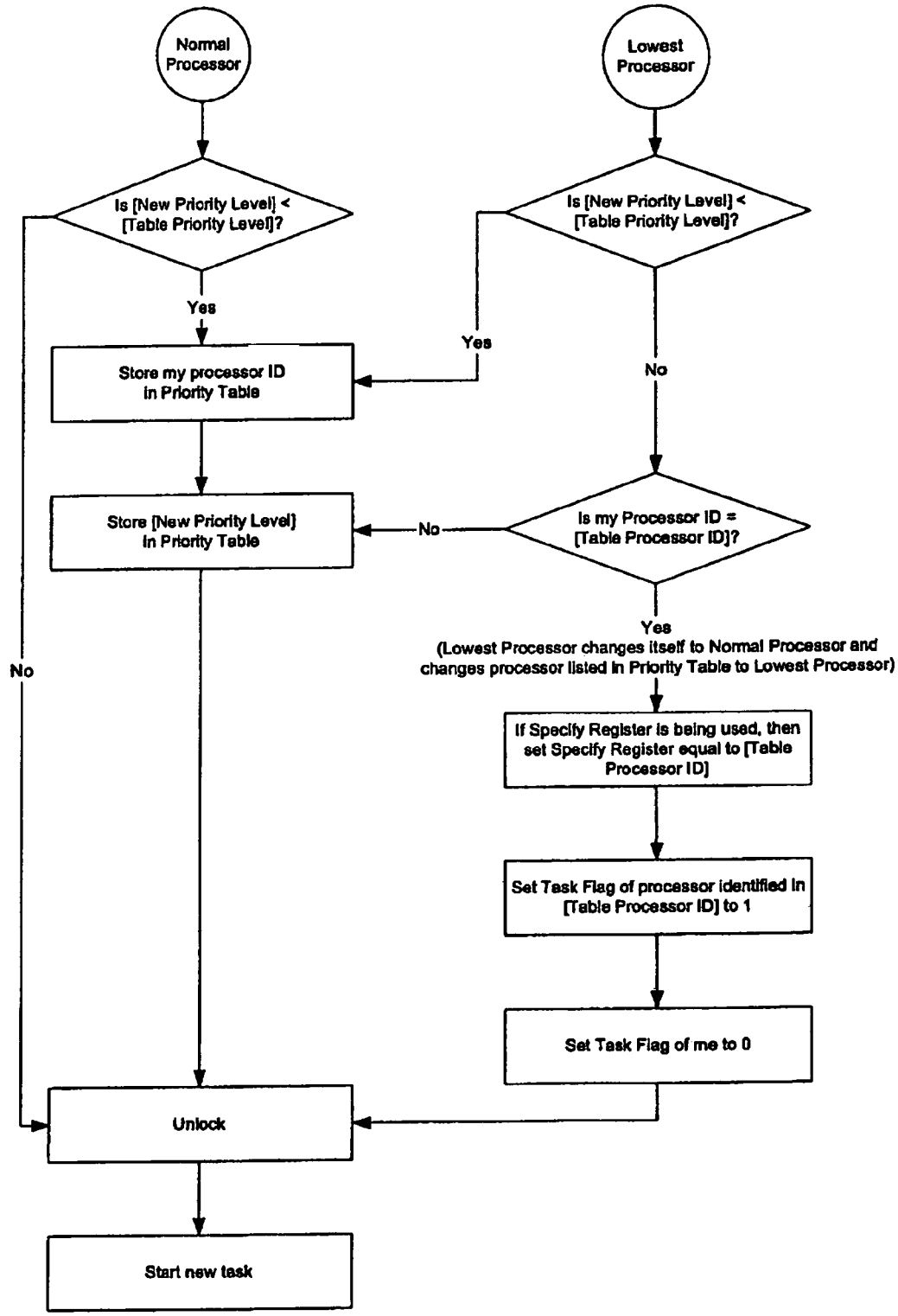
FIG. 5 is a flowchart of some of the steps performed by a processor when switching tasks in accordance with aspects of the present invention.

FIG. 4 illustrates one example of how a processor changes (or not) the Priority Table 160, Task Flags 165 and other information when the processor is required to switch to a new task. It should be assumed for the purposes of this example that only one of the task flags 165 will have the value of 1 and the other task flags will have the value of 0. All of the steps in FIG. 4 preferably take place in a single processor such as SPU 108a.

When an SPU is instructed to perform a new task, it first locks itself to prevent processing of its current task.

Next, the SPU that is having its task switched (hereafter, the "switching processor" or "switching SPU") gathers information that it may need to determine how the priority level of the new task [New Priority Level] relates to the priority level [Table Priority Level] of the processor that is currently identified [Table Processor ID] in the Priority Table 160.

The switching SPU then determines whether its Task Flag 165 indicates that it is Lowest Processor. As indicated above, in one embodiment this test is performed by determining whether the Task Flag value is 1 where only one of the Task Flags 165 is permitted to have the value of 1.

If the switching processor is not the Lowest Processor (hereafter, a processor that is not the Lowest Processor shall be referred to as a "Normal Processor"), the switching processor will compare the priority of the new task [New Priority Level] to the priority of the task currently listed in the Priority Table [Table Priority Level].

If a Normal Processor's new priority level is greater than the priority level stored in the Priority Table, then the Normal Processor will simply unlock and start the new task.

If a Normal Processor's new priority level is less than the priority level stored in the Priority Table, then this indicates that the Normal Processor's new task is likely—at that moment—the lowest priority task among the various processors (such as SPUs 108). Accordingly, the Normal Processor will store its ID and [New Priority Level] in the Priority Table 160. After it updates the Priority Table, the Normal Processor will unlock itself and start the new task.

In accordance with one aspect of the invention, a Normal Processor will not change its Task Flag, any other Task Flag, or any of the registers of the Interrupt Generator despite the fact that the new task has a lower priority than the task listed in the Priority Table. Rather, those functions are delegated to be performed by the Lowest Processor when the Lowest Processor eventually switches tasks. In this regard, at any given moment in time, the Lowest Processor is not necessarily the processor with the lowest-priority task.

If the switching SPU is the Lowest Processor, then the SPU will compare the priority of the new task [New Priority Level] to the priority of the task currently listed in the Priority Table [Table Priority Level].

If the Lowest Processor's new priority level is less than the priority level stored in the Priority Table, then the Lowest Processor will store its ID and the new priority level in the Priority Table 160. After it updates the Priority Table, the Lowest Processor then unlocks and starts the new task.

However, if the Lowest Processor's new priority level is greater than or equal to the priority level stored in the Priority Table, then the Lowest Processor will determine whether the Priority Table is pointing to it. In other words, at this point, the switching Lowest Processor will determine whether it is the processor currently listed in the Priority Table as having the task with the lowest priority.

If the Priority Table is pointing at the Lowest Processor at this point, then the Lowest Processor will set the priority level contained in the Priority Table to the same level as its new task. However, it will not change the Priority Table to point at the Lowest Processor because the next Lowest Processor is not the current Lowest Processor.

If the Priority Table is not pointing at the Lowest Processor, and if as noted above the new task is more important than the task listed in the Priority Table, then the Lowest Processor will set the Task Flag of the processor listed in the Priority Table to the value of 1 (thus making that processor the Lowest Processor). The switching processor then changes its Task Flag to 0 (thus changing the switching processor from the Lowest Processor to a Normal Processor). The switching processor—which was the Lowest Processor but is now a Normal Processor—then unlocks itself and starts the new task.

In accordance with the foregoing operation, it is thus the Lowest Processor that determines which processor is designated as the Lowest Processor. The Lowest Processor may determine that it will stay the Lowest Processor after a task switch, or it may determine that another one of the processors will now be the Lowest Processor. Moreover, a Normal Processor does not change its own or other processor's Task Flags; rather, that is the responsibility of the Lowest Processor.

In the Specify Register Embodiment, the switching processor will also update the Specify Register 151 before or after it designates another processor as the Lowest Processor. Specifically, it will set the register equivalent to a value that points to the new Lowest Processor. In the foregoing example, the Specify Register would be set to [Table Processor ID].

Figure 6:
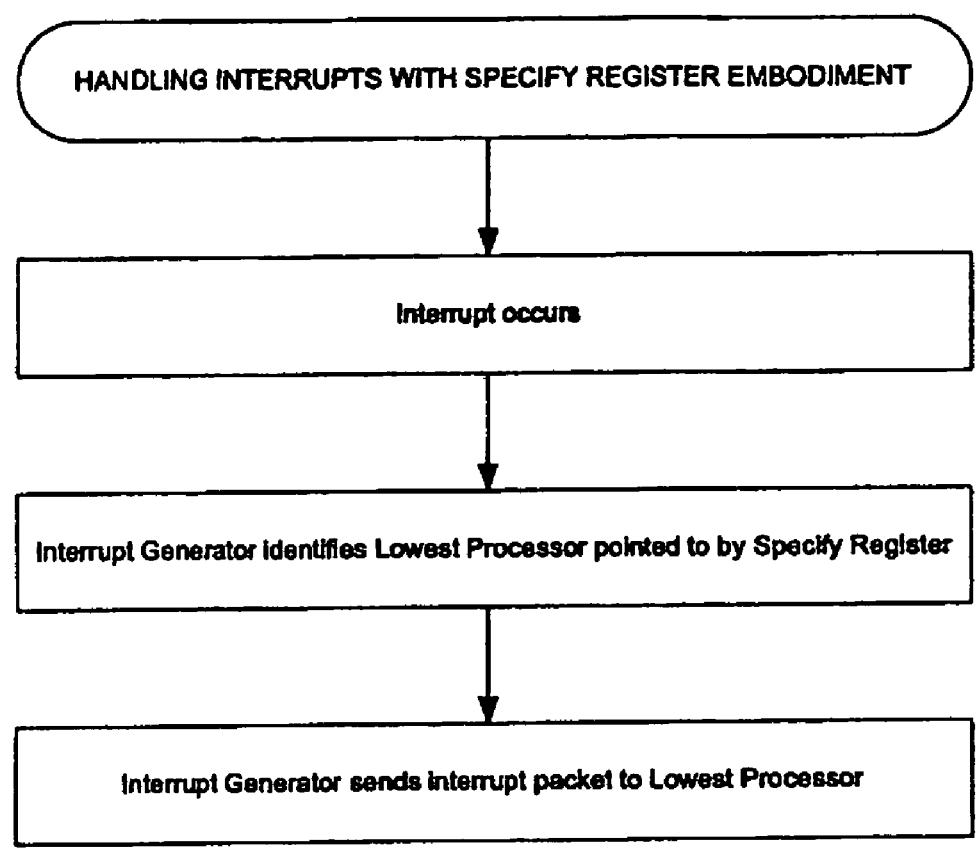
FIG. 6 is a flowchart of some of the steps performed by a system in accordance with the Specify Register Embodiment in accordance with aspects of the present invention.

FIG. 6 illustrates one possible operation whereby interrupts are handled in accordance with the Specify Register Embodiment. When an interrupt occurs, Interrupt Generator 150 determines the identity of the Lowest Processor by checking the value stored in Specify Register 151. Once the Lowest Processor is identified, IG 150 then sends an interrupt packet to the Lowest Processor.

Figure 7:
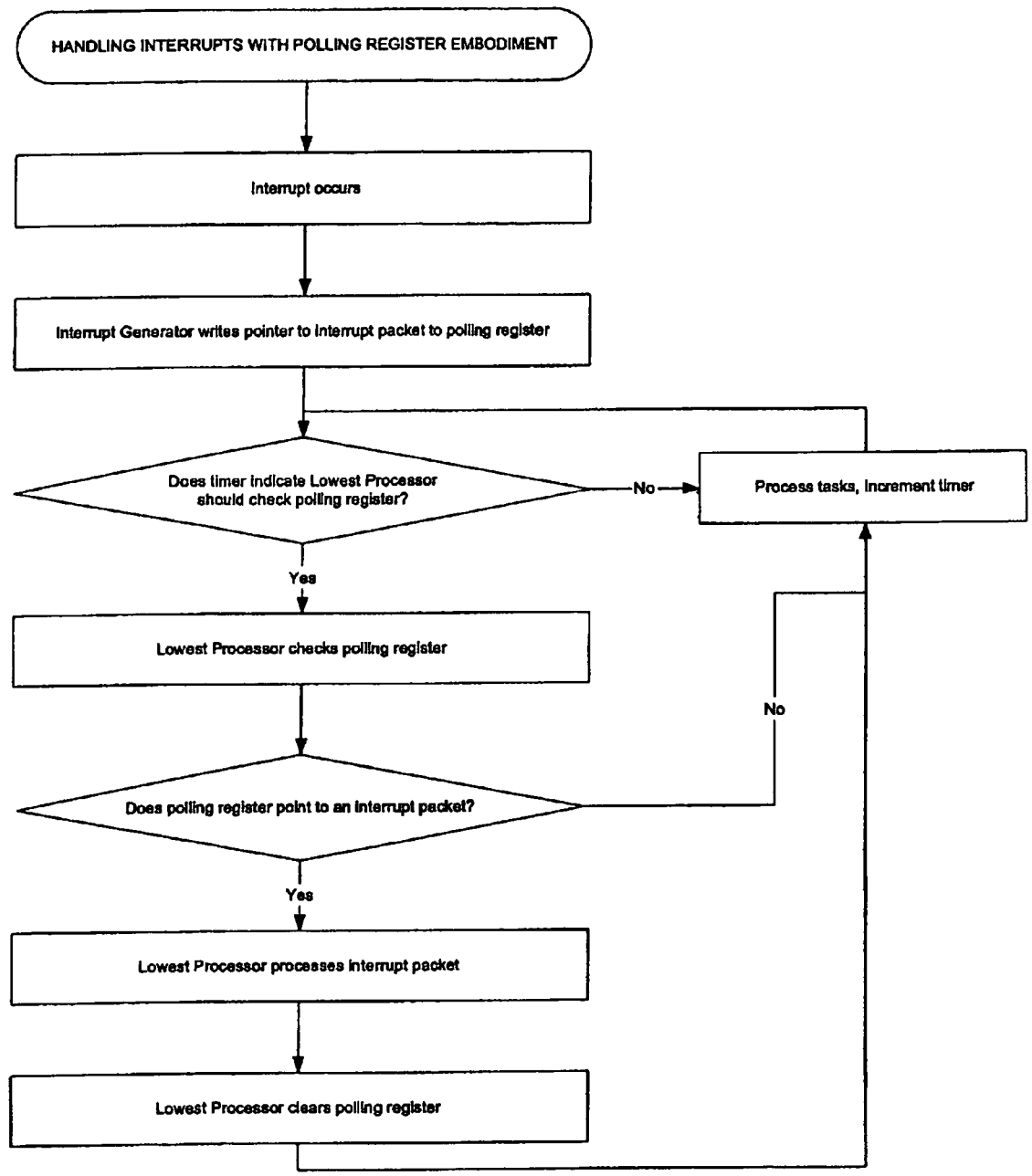
FIG. 7 is a flowchart of some of the steps performed by a system in accordance with the Polling Register Embodiment in accordance with aspects of the present invention.

FIG. 7 illustrates one possible operation whereby interrupts are handled in accordance with the Polling Register Embodiment. When an interrupt occurs, IG 150 sets the value of the register such that it indicates that an interrupt is pending. For example, the value may be flag that an interrupt is awaiting disposition or it may be a number assigned to a particular type of interrupt. For the purposes of illustration, however, it shall be assumed that Polling Register points to the interrupt packet associated with the interrupt whenever an interrupt is awaiting handling When the Lowest Processor receives a tick from timer 180 (FIG. 1), it determines whether it should check the Polling Register for the presence of an interrupt packet. For example, the Lowest Processor may automatically check the Polling Register every 1 msec, particularly if the processor usually switches tasks no more than every 10 msec.

If the polling register is clear, then the Lowest Processor and other SPUs will simply process their currently-pending tasks.

If the polling register is not clear, then the Lowest Processor will then use the interrupt packet designated by the Polling Register to determine which task is to be executed in response to the interrupt. The Lowest Processor will then clear the register.

When the Lowest Processor, or any other processor, switches from its current task to a task for handling an interrupt, it preferably goes through the same operation discussed above in connection with FIG. 4. Accordingly, if an interrupt handler task is a higher priority than one of the tasks being handled by another one of the processors, then the interrupt-handling processor will change the priority table. It will cause a different processor to become the Lowest Processor when the task switch occurs.

Accordingly, one aspect of the invention assigns the responsibility of identifying the next processor to handle an interrupt to one of the processors among a collection of processors. Whenever that processor switches tasks and determines that it is no longer the least important processor as far as task priority is concerned, it will then select and transfer its interrupt-related responsibilities (i.e., handling the interrupt and determining the next interrupt-handing processor) to the processor which is executing the least important task. The selected processor will then be designated for handling interrupts unless and until it undergoes a task switch and selects a different processor.

In accordance with operations discussed above, the following elements will have the following access to other elements of the system. The Lowest Processor will be capable of at least: writing to and reading from Priority Table 160; writing to the Task Flag 165 of one of the other SPUs 108, and; writing to the Specify Register 151 or the Polling Register 152 of Interrupt Generator 150. A Normal Processor will be capable of at least writing to and reading from Priority Table 160. IG 150 will be capable of at least: sending information to the Lowest Processor in the Specify Register Embodiment; reading the Specify Register 151 in the Specify Register Embodiment, and; writing to the Polling Register 152 in the Polling Register Embodiment.

One of the advantages of the present invention is its ability to accommodate a wide variety of alternatives to the example structural elements and operations discussed above.

For example, while most of the foregoing discussion used the SPUs as examples of processors that are capable of handling interrupts and managing which processor will handle the next interrupt (and the invention is particularly advantageous when used in connection with PEs such as those described above), the invention is also applicable to collections of other processors. For example, the invention may also be applied at the system level shown in FIG. 2 where each PE is considered one processor among a collection of processors that handle interrupts.

The foregoing discussion has assumed that each SPU executes only a single task. However, the invention is equally applicable to SPUs which are themselves capable of multi-tasking. However, it would be preferable in such a system for such an SPU to have a multi-bit task flag to reflect this capability.

The Priority Table 160 may also be used to store additional information. For example, it may store the following columns of information: (1) the identity of an SPU, (2) the identity of the task assigned to the SPU, and (3) the priority value of that task. Moreover, it may a store a single row for each SPU. Such a Priority Table provides the advantage of providing a snapshot of the priorities of all of the various SPUs. However, even if such a Priority Table is used, it is preferable to provide a means for quickly identifying the SPU having the task with the lowest priority value.

The Priority Table may also store additional information in order to prevent priority inversion difficulties. Such a difficulty might occur when: the normal processor receives new task which is lower than the Lowest Processor (making the normal processor the "Next Lowest Processor"); the Next Lowest Processor over-writes the Priority Table; the Next Lowest Processor receives new task which is higher than the Lowest Processor, and; the Lowest Processor receives higher task and switches to the Next Lowest Processor. However, the Next Lowest Processor is not the processor with the lowest task anymore. To address this, the Priority Table may store the following information: a priority level reflecting the lowest task priority; a processor ID identifying the processor with the lowest priority task; a Curr Priority Level reflecting the Lowest Processor's priority, and; a Curr Processor ID identifying the Lowest Processor (where the Curr Priority Level and Curr Processor ID holds the current Processor ID information).

Moreover, the Specify and Polling Register Embodiments are not mutually exclusive. By way of example only, certain interrupt information could be sent immediately to an SPU in accordance with the Specify Register Embodiment whereas other interrupt information may be placed in the Polling Register Embodiment for polling by the Lowest Processor.

Unless stated to the contrary, use of words such as "including," "containing," "such as," "comprising" and the like, means "including without limitation" and shall not be construed to limit any general statement that it follows to the specific or similar items or matters immediately following it. References to a "plurality" of things means at least two of the things, and, unless stated to the contrary, reference to "a" or "one" thing does exclude the possibility of using a plurality of such things.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of handling interrupts in a system of multiple processors comprising:
storing a designation value at each processor identifying whether the processor is the designated processor, wherein the designated processor handles interrupts to the system;
the designated processor selecting which one of the other processors should be designated next;
when the designated processor selects a processor different than itself, the designated processor changing the designation value of itself and the designation value of the selected processor to indicate that the selected processor is the designated processor;
wherein the step of selecting occurs when the designated processor is switching to a new task,
wherein a priority memory location is provided for storing a value identifying the processor having the lowest priority task and the priority value of such task, and
wherein the step of selecting comprises comparing the priority value of the new task with the priority value stored in the priority memory location, and selecting either the designated processor or the processor identified in the priority memory location based on the result of such comparison.

2. The method of claim 1 wherein a specified processor memory is provided for storing a value identifying the designated processor, the method further comprising:
transmitting interrupt information to the designated processor, based on the value of the specified processor memory, upon the occurrence of an interrupt; and
the designated processor performing a task in response to the interrupt.

3. The method of claim 1 wherein a polling memory is provided for storing information indicating the presence of an interrupt, the method further comprising:
the designated processor checking the polling memory at intervals of time to determine whether an interrupt has occurred; and
the designated processor performing a task in response an interrupt if the polling memory indicates that an interrupt has occurred.

4. A method of handling interrupts in system comprising a plurality of processors, the method comprising:
handling an interrupt at a designated one of the processors, wherein a memory indicates which processor is the designated processor;
the designated processor selecting either it or another one of the processors to be the designated processor;
if the designated processor determines that another one of the processors should be designated processor, then the designated processor modifies the memory to indicate that the other processor is the designated processor;
wherein the step of selecting occurs when the designated processor is switching to a new task,
wherein a priority memory location is provided for storing a value identifying the processor having the lowest priority task and the priority value of such task, and
wherein the step of selecting comprises comparing the priority value of the new task with the priority value stored in the priority memory location, and selecting either the designated processor or the processor identified in the priority memory location based on the result of such comparison.

5. A multi-processor system comprising:
a priority table including a processor identification and a priority identification,
a first processor for handling a non-interrupt task at a first priority level, the first processor writing its first priority level and processor identification to the priority table if its first priority level is equal or lower to that in the priority table, and
a second processor for handling an interrupt task at a second priority level, the second processor checking upon a task switch for another processor in the priority table with lower or equal priority level, wherein if found, the second processor designates the first processor for handling further interrupts;
wherein when a selected one of the first and second processors is instructed to perform a new task, the selected processor locks itself to prevent processing of a current task, and if the selected processor has a priority level greater than a given priority level stored in the priority table, then the selected processor unlocks itself to enable processing of the new task.

6. A method of handling interrupts in a multi-processor system, comprising:
providing a plurality of processors communicating over a system bus, the plurality of processors operable to execute a plurality of tasks at a plurality of priority levels, the plurality of processors each having an associated task memory;
providing storage for the plurality of processors at a system memory, the system memory communicating with the plurality of processors over the system bus, the system memory including a memory structure for storing a lowest priority level of the plurality of priority levels associated with the plurality of processors;
designating, via the memory structure, a first processor of the plurality of processors having a lowest priority level as a lowest priority processor;
setting the task memory of the lowest priority processor to designate it as lowest priority processor;
setting a specify register of an interrupt generator to be associated with the lowest priority processor;
sending a third task generated by the interrupt generator directly to the lowest priority processor;
handling the third task at the lowest priority processor until a task switch; and,
determining at the lowest priority processor, upon a task switch, if the lowest priority processor still has lowest priority level among the plurality of processors, and if not, designating a second processor of the plurality of processors having a lowest priority as the lowest priority processor by setting the task memory of the second processor to designate it as the lowest priority processor, updating the specify register of the interrupt generator to the second processor, and unsetting the task memory of the first processor.

7. The method of claim 6 wherein the task switch comprises switching from a first task to a second task of the plurality of tasks, or completion of the third task.

8. The method of claim 6, further comprising:

providing at the interrupt generator a polling register, a polling tick timer, and, a fourth task, the fourth task generated by the interrupt generator and stored in the polling register;

polling the polling register by the lowest priority processor at a polling time period set by the polling tick timer;

executing the fourth task at the lowest priority processor; and, clearing the polling register by the lowest priority processor.

9. The method of claim 7 wherein the memory structure comprises a priority table, the priority table listing one of the plurality of processors as a lowest priority processor.

10. A distributed interrupt handling system, comprising:

a plurality of processors connected via a system bus, each of the processors including an operating system kernel for executing a first task and a second task, each of the processors having a priority level and an associated task memory for identifying whether each of the processors is a lowest priority processor of the plurality of processors;

a system memory accessible to the plurality of processors via the system bus, the memory including a memory structure associated with at least the lowest priority processor and the lowest priority level of the processors; and, an interrupt generator, the interrupt generator including a specify register associated with the lowest priority processor;

a third task generated by the interrupt generator, the third task directly sent to the lowest priority processor for execution over the system bus;

a task switch for switching from the first task to the second task, upon the task switch the priority structure is updated;

a second processor of the plurality of processors, wherein if the lowest priority processor is no longer of lowest priority in the priority structure, the lowest priority processor then designates the second processor as a second lowest priority processor by setting the associated task memory of the second processor, updating the specify register of the interrupt generator, and unsetting the associated task memory of the lowest priority processor.

11. The system of claim 10, wherein the priority structure comprises a priority table, the priority table including data associated with the lowest priority level and the lowest priority processor.

12. The system of claim 10, wherein the priority table only contains a priority level for one processor.

* * * * *

UNITED STATES PATENT AND TRADEMARK OFFICE
CERTIFICATE OF CORRECTION

PATENT NO. : 7,350,006 B2  Page 1 of 1
APPLICATION NO. : 11/346947
DATED : March 25, 2008
INVENTOR(S) : Masahiro Yasue et al.

It is certified that error appears in the above-identified patent and that said Letters Patent is hereby corrected as shown below:

Col. 2, Line 47, "refers" should read -- refer --.

Col. 2, Line 51, "require" should read -- requires --.

Col. 5, Line 18, "are" should read -- is --.

Col. 9, Line 56, after "response", insert -- to --.

Col. 9, Line 59, before "system", insert -- a --.

Col. 9, Line 67, before "designated", insert -- the --.

Signed and Sealed this

Twentieth Day of October, 2009

David J. Kappos
*Director of the United States Patent and Trademark Office*